Patented June 11, 1940

2,204,213

UNITED STATES PATENT OFFICE 2,204,213

STIMULATION OF PLANT GROWTH BY THE TREATMENT OF SEEDS

Nathaniel Hew Grace, Ottawa, Ontario, Canada, assignor to The Honorary Advisory Council for Scientific and Industrial Research, Ottawa, Ontario, Canada, a corporation of Canada No Drawing. Application June 27, 1938, Serial No. 217,819. In Canada August 20, 1937

4 Claims. (Cl. 47—58)

This invention relates to the stimulation of plant growth by the use of the class of chemicals known as plant hormones and is particularly directed to a method of treating seeds with such hormones for stimulating and increasing the germination of the seeds as well as the growth therefrom of plants.

It is known that the formation of roots on cuttings of plants can be initiated if the lower end of the cutting is coated with or soaked in a dilute solution of a growth-promoting hormone.

Various attempts have been made to apply the growth hormones to seeds, such as wheat, barley, soya bean, tomato, etc. by immersing the seeds in a dilute solution of the hormone, drying and then planting, but without satisfactory results. By applying the hormones in a dilute solution to seeds and then planting after drying, applicant has confirmed the findings of several investigators as summarized by Boysen-Jensen (Growth Hormones in Plants—McGraw-Hill Book Co., New York 1936, p. 101) who says: "It has been determined with certainty, therefore, that the rate of growth of roots is retarded by the addition of growth substance, and from this it might be concluded that growth substance is not necessary for the growth of roots." This method of applying the hormones to seeds appears to effect a considerable concentration of the hormone in the seed and it seems to be necessary to avoid such concentrations and at the same time to supply the hormones very gradually to the roots of the germinating and growing seeds and seedlings.

Boysen-Jensen says: (above reference, p. 101, paragraph 3) . . . "the optimum concentration for the root growth must be very low." Applicant has found that by immersing the seeds in ordinarily dilute solutions of the hormones, drying and planting, the experiments have resulted in inferior germination and growth. Immersion in extremely dilute solutions shows very slight observable effects and immersion in somewhat stronger solution, followed by drying and planting, retards and even suppresses germination and growth. Furthermore, wetting of seed and drying is very inconvenient in large scale practice.

The object of the present invention is to provide a method, for the successful, commercial application of these growth-promoting hormones to seeds, in which the rate of application of the hormone to the germinating and developing seed and plant is controlled so that the hormone is gradually adsorbed by the germinating seed and developing plant to avert deleterious concentrations and in which the total amount of hormone applied during the period of growth is controlled within well defined limits.

The germination of seeds supplied with hormones in accordance with the invention is rapid, uniform, and vigorous in comparison with heretofore known methods and the same is true of the growth of the root system and of the aerial parts of the plant.

The following illustrate the comparative rates of stimulation of germination and growth. In a series of tests it was found that in thirteen (13) days the average germination of hormone treated wheat seed was 91% while the average for untreated controls was 76%. The root systems of month-old plants from the hormone treated seeds were more profuse and had a greater aggregate length and the diameters of the plants at the crown were greater. It was found that wheat seeds treated with α-naphthyl acetic acid and with indolyl butyric acid, produced a larger number of seminal roots. The aerial parts showed greater development in month-old plants and produced 25% more heads than control plants. Furthermore, the plants from hormone treated wheat seeds have been found to be more protected against fungus disease than untreated seeds.

The invention has been applied to seeds of wheat, oats, barley, soya bean, etc. and it has been found that the following chemicals, known as plant hormones, may be employed with desirable effects in the present method, viz: indolyl-3-acetic acid, indolyl butyric acid, α-naphthyl acetic acid, phenyl-acetic acid, indolyl propionic acid, and the salts and esters of the same.

In carrying out the invention one or more of the hormone chemicals is intimately and uniformly incorporated with a finely divided carrier having adsorptive and absorbent qualities and which will adhere to the seeds when mixed with them. The intimate mixture may be obtained by a grinding-mix in a ball mill. Some of the hormone chemicals, for example the methyl ester of indolyl-3-acetic acid, which are liquids, may be dispersed with alcohol or other solvent into the dust carrier and thoroughly incorporated therewith, as by a grinding-mix following which the mixture is dried and pulverized. An appropriate amount of the prepared mixture is mixed with the seed before planting. A dust carrier, containing 0.1% to 10% by weight of one or more of the hormone chemicals mixed with seeds at the rate of 500 parts per million parts by weight of seed indicates relative proportions which give the desired results.

Dusts having the desired adsorptive, absorbent and adherent characteristics required in the carrier are of clay, talc, charcoal, starch, flour and the like.

In some cases it is advantageous to incorporate in the mixture a portion of chemical, such as, for example, various organic mercurial compounds, to disinfect the seeds against fungus and smut growths. It is common practice to treat cereal seeds with fungicides and no extra labour is involved in combining both treatments in the one operation.

Amounts of these hormone chemicals in excess of 100 parts per million by weight of seed causes damage to the resulting seedlings. From 2 to 500 parts of indolyl-3-acetic acid, indolyl butyric acid or indolyl-propionic acid, or the salts and esters of the same, per 10,000,000 parts of seed by weight, when applied as described, give the desired results. Similarly, from 0.1 to 100 parts of α-naphthyl-acetic acid, its esters or salts per million parts of seed by weight give the desired results.

The following illustrations are given:

Three lots of 14-day old wheat seedlings were observed. In one lot the seed was treated with a disinfecting dust containing a standard organic mercury compound. In this lot of plants the average total length of roots per plant was 104.8 millimeters. In a second lot the wheat seed was treated with the same disinfecting dust, but there was incorporated in the dust before treating the seeds, an amount of indolyl acetic acid so that the treated wheat seed received 2 parts per million of the hormone per million parts by weight of seed. In this second lot the average total length of roots per plant was 169.8 millimeters. In a third lot, the wheat seed was treated with the same disinfecting dust, but there was incorporated with the dust amounts of indolyl-acetic acid and α-naphthyl acetic acid before applying to the seed, so that the wheat seed received 2 parts each of these plant hormones per million parts by weight of wheat seed. In this third lot the average length of roots per plant rose to 212.5 millimeters.

In another series of tests it was found that after a period of one month outside in soil, wheat treated with two parts of α-naphthyl acetic acid per million parts by weight of seed along with an organic mercury disinfectant, according to the invention, showed an increase in dry weight of the aerial parts of 29% over controls which were treated with the disinfectant only.

In another series of tests, it was found that after a period of one month outside in soil, wheat treated with ten parts of indolyl butyric acid in talc dust per million parts by weight of seed showed an increase of 24% in dry weight of the aerial parts over controls which were treated with talc dust alone.

Similarly in tests with soya beans, using no disinfectant, but treated, according to the present method, with 10 parts of indolyl acetic acid per million parts by weight of seed there was, after six weeks, an increase in the dry weight of aerial parts of 30% over controls.

In another test with soya beans, using an organic mercury disinfectant along with 10 parts of α-naphthyl acetic acid per million parts by weight of seed there was an increase after six weeks of 120% in the dry weight of the aerial parts over the controls which were treated with the disinfectant only.

I claim:

1. A method of stimulating and increasing the germination of seeds and growth of seedlings which comprises mixing the seed before planting with an adsorptive, adherent dust having intimately incorporated therein 0.1 to 10% of hormone chemicals, the proportion of hormone-chemical-dust mixture being 2 to 500 parts per million parts by weight of seed.

2. A method as defined in claim 1, wherein the hormone chemicals are from a group consisting of indolyl-3-acetic acid, indolyl butyric acid, α-naphthyl acetic acid, phenyl acetic acid, indolyl propionic acid, and their salts and esters.

3. A method of stimulating and increasing the germination of seeds and the growth of seedlings therefrom which comprises intimately incorporating 0.1 to 10% of at least one of a group consisting of α-naphthyl-acetic acid, its salts and esters with an adsorptive, adherent dust and mixing the hormone-containing dust with the seed, the said hormone-dust mixture containing less than 10 parts of the hormone chemical per million parts by weight of the seed treated.

4. A composition of matter for the treatment of seed comprising an adsorptive, adherent dust and 0.1 to 10% of the weight of the dust of hormone chemical, said chemical being at least one of a group consisting of indolyl-3-acetic acid, indolyl butyric acid, α-naphthyl acetic acid, phenyl acetic acid, indolyl propionic acid their salts and esters.

NATHANIEL HEW GRACE.